United States Patent [19]

Iizuka

[11] Patent Number: 5,649,881
[45] Date of Patent: Jul. 22, 1997

[54] LOCK-UP CONTROLLING APPARATUS FOR AUTOMATIC TRANSMISSION

[75] Inventor: Naonori Iizuka, Fuji, Japan

[73] Assignee: Jatco Corporation, Fuji, Japan

[21] Appl. No.: 549,113

[22] Filed: Oct. 27, 1995

Related U.S. Application Data

[62] Division of Ser. No. 526,283, Sep. 11, 1995, which is a continuation of Ser. No. 237,167, May 3, 1994, abandoned.

[30] Foreign Application Priority Data

May 14, 1993 [JP] Japan .................... 5-136520

[51] Int. Cl.$^6$ .................................................. B60K 41/28
[52] U.S. Cl. .................................................. 477/169; 477/65
[58] Field of Search .................... 477/65, 169, 176

[56] References Cited

U.S. PATENT DOCUMENTS

| | | | |
|---|---|---|---|
| 4,159,051 | 6/1979 | Hiraiwa | 477/168 |
| 4,664,235 | 5/1987 | Yokoyama et al. | 477/168 |
| 4,732,245 | 3/1988 | Hiramatsu | 192/0.032 |
| 4,940,122 | 7/1990 | Fujieda | 477/169 |
| 5,029,087 | 7/1991 | Cowan et al. | 477/169 |
| 5,060,769 | 10/1991 | Yoshimura et al. | 477/169 |
| 5,085,301 | 2/1992 | Imamura et al. | 477/169 |
| 5,086,894 | 2/1992 | Iizuka et al. | 477/169 |
| 5,133,232 | 7/1992 | Kikuchi et al. | 477/65 |
| 5,143,191 | 9/1992 | Nobumoto et al. | 477/176 |
| 5,202,833 | 4/1993 | Fodale | 477/176 |
| 5,325,946 | 7/1994 | Kashiwabara et al. | 477/168 |
| 5,417,622 | 5/1995 | Asayama et al. | 477/65 |

FOREIGN PATENT DOCUMENTS

| | | |
|---|---|---|
| 6-116170 | 6/1986 | Japan . |
| 2-203072 | 8/1990 | Japan . |

*Primary Examiner*—Dirk Wright
*Attorney, Agent, or Firm*—Foley & Lardner

[57] ABSTRACT

In response to a signal indicating the present throttle valve opening degree detected by a throttle valve sensor and a signal indicating the present vehicle speed detected by a vehicle speed sensor, a lock-up controller determines whether a lock-up clutch should be brought into the operatively connected state or it should be released from the operatively connected state, and on completion of the foregoing determination, the controller outputs a certain signal to a solenoid valve. In the case that the lock-up clutch has been released, this state is maintained. On the contrary, in the case that the lock-up clutch has been in the operatively connected state, the controller determines whether maintains this state or selects a lock-up clutch releasing pattern depending on the present throttle valve opening degree. Specifically, the controller selects a pattern in such a manner that the operative connecting force of the lock-up clutch is quickly reduced at the time of coasting of a vehicle, it is slowly reduced at the time of an intermediate throttle valve opening degree, and it is appreciably slowly reduced at the time of a large throttle valve opening degree. With such control, a driver does not unpleasantly feel a stifling shock at the time of coasting, and moreover, acceleration behavior of the vehicle is enhanced at the time of a large throttle valve opening degree.

5 Claims, 8 Drawing Sheets

LOCK-UP CONTROLLING APPARATUS FOR AUTOMATIC TRANSMISSION

This application is a division of application Ser. No. 08/526,283, filed Sep. 11, 1995, which is a continuation of application Ser. No. 08/237,167, filed May 3, 1994, abandoned.

BACKGROUND OF THE INVENTION

1. Field of the Invention

The present invention relates generally to a lock-up controlling apparatus for an automatic transmission. More particularly, the present invention relates to improvement of a lock-up controlling apparatus of the foregoing type.

2. Description of the Related Art

Conventional typical lock-up controlling apparatuses each employable for an automatic transmission are disclosed in Japanese Patent Application Laying-Open Nos. 61-116170 and 2-203072.

To facilitate understanding of the present invention, each of the conventional lock-up controlling apparatuses as mentioned above will briefly be described below.

The lock-up controlling apparatus disclosed in Japanese Patent Application Laying-Open No. 61-116170 includes as essential components a fluid coupling interposed between the output shaft of an engine and the input shaft of a transmission for transmitting a torque outputted from the engine to the input shaft of the transmission, a direct connection clutch disposed in parallel relationship relative to the fluid coupling for operatively connecting the output shaft of the engine directly to the input shaft of the transmission in preference to the fluid coupling as desired, a load sensor for detecting loaded states of the engine, a vehicle speed sensor for detecting the running speed of a vehicle, and a shifting mechanism for shifting the direct connection clutch to the operative state when it is found that load detected by the load sensor and vehicle speed detected by the speed sensor lie within a predetermined direct connection range defined by a desired engine load range and a desired vehicle speed range. In addition, the lock-up controlling apparatus includes a shifting operation postponing unit which is disposed in the shifting mechanism for gradually reducing an intensity of operative connecting force of the direct connection clutch in order to prevent the torque appearing on the output shaft of the transmission from being quickly reduced when the shifting mechanism is shifted from the direct connection range to the non-direct connection range having a high magnitude of load.

On the other hand, the lock-up controlling apparatus disclosed in Japanese Patent Application Laying-Open No. 2-203072 includes a lock-up clutch mechanism for controllably setting an intensity of an operative connecting force to a predetermined value within a predetermined working range determined on the basis of engine load and the number of revolutions of a power transmission system. When a transition to a working range where a lock-up clutch is completely released is detected within a predetermined working range where the lock-up clutch is held in the half operatively connected state or the like, the operative connecting force of the lock-up clutch is controlled in such a direction as to allow an intensity of the same to be reduced from the point of time within the predetermined working range.

However, with each of the conventional lock-up controlling apparatuses each employable for an automatic transmission discussed above since an intensity of operative connecting force of the lock-up clutch is gradually reduced regardless of the present state of the engine load when the lock-up clutch is shifted to the released state, there arises a malfunction that the releasing of the lock-up clutch from the operative state is delayed at the time of coasting of a vehicle. As a result, since an engine brake functions in excess of a predetermined level, there appears a problem that a diver unpleasantly feels a stifling shock in the course of coasting of his vehicle. Also in the case that a throttle valve is largely opened to assume a large throttle valve opening degree, since an intensity of operative connecting force of the lock-up clutch is likewise gradually reduced, there appears another problem that acceleration behavior of the engine is unavoidably degraded.

SUMMARY OF THE INVENTION

The present invention has been made in consideration of the aforementioned background.

An object of the present invention is to provide a lock-up controlling apparatus for an automatic transmission which assures that there do not arise malfunctions that a driver unpleasantly feels a stifling shock at the time of coasting of his vehicle, and moreover, acceleration behavior of an engine or a vehicle is degraded at the time of a large throttle valve opening degree.

According to one aspect of the present invention, there is provided a lock-up controlling apparatus for an automatic transmission including an engine load sensor for detecting an engine load, a vehicle speed sensor for detecting a vehicle speed, lock-up determining means for determining based on a detection value derived from the engine load sensor and a detection value derived from the vehicle speed sensor whether a lock-up clutch should be brought into an operatively connected state or the lock-up clutch should be released from the operatively connected state, and lock-up actuating means for bringing the lock-up clutch into the operatively connected state or releasing the lock-up clutch from the operatively connected state based on a result derived from the determination made by the lock-up determining means, comprising;

lock-up release controlling means for changing a pattern representing the reduction of an operative connecting force of the lock-up clutch based on an engine load detection value at the time when it is determined that the lock-up clutch should be released from the operatively connected state.

With the lock-up controlling apparatus constructed in the above-described manner, when a magnitude of engine load detection value is smaller than a first predetermined value, the operative connecting force of the lock-up clutch may preferably be quickly reduced.

Alternatively, the reduction of the operative connecting force of the lock-up clutch may be attained in the following manner. Specifically, when a magnitude of the engine load detection value is smaller than a first predetermined value, the operative connecting force of the lock-up clutch is reduced at a first high speed, in the case that a magnitude of the engine load detection value lies between the first predetermined value and a second predetermined value larger than the first, the operative connecting force of the lock-up clutch is reduced at a third low speed, and in the case that a magnitude of the engine load detection value is larger than the second predetermined value, the operative connecting force of the lock-up clutch is reduced at a second intermediate speed lying between the first high speed and the third low speed.

In addition, according to other aspect of the present invention, there is provided a lock-up controlling apparatus for an automatic transmission including an engine load sensor for detecting an engine load, a vehicle speed sensor for detecting a vehicle speed, lock-up determining means for determining based on a detection value derived from the engine load sensor and a detection value derived from the vehicle speed sensor whether a lock-up clutch should be brought into an operatively connected state or the lock-up clutch should be released from the operatively connected state, and lock-up actuating means for bringing the lock-up clutch into the operatively connected state or releasing the lock-up clutch from the operatively connected state based on a result derived from the determination made by the lock-up determining means, comprising;

lock-up release controlling means for changing a pattern representing the reduction of an operative connecting force of the lock-up clutch based on a vehicle speed detection value at the time when it is determined that the lock-up clutch should be released from the operatively connected state.

With the lock-up controlling apparatus constructed in the above-described manner, when a magnitude of the vehicle speed detection value is higher than a first predetermined value, the operative connecting force of the lock-up clutch may preferably be quickly reduced.

Alternatively, the reduction of the operative connecting force of the lock-up clutch may be attained in the following manner. Specifically, when a magnitude of the vehicle speed detection value is higher than a first predetermined value, the operative connecting force of the lock-up clutch is reduced at a first high speed, in the case that a magnitude of the vehicle speed detection value lies between the first predetermined value and a second predetermined value lower than the first, the operative connecting force is reduced at a third low speed, and in the case that a magnitude of the vehicle speed detection value is lower than the second predetermined value, the operative connecting force is reduced at a second intermediate speed lying between the first high speed and the third low speed.

Further, according to another aspect of the present invention, there is provided a lock-up controlling apparatus for an automatic transmission including an engine load sensor for detecting an engine load, a vehicle speed sensor for detecting a vehicle speed, lock-up determining means for determining based on a detection value derived from the engine load sensor and a detection value derived from the vehicle speed sensor whether a lock-up clutch should be brought into an operatively connected state or the lock-up clutch should be released from the operatively connected state, and lock-up actuating means for bringing the lock-up clutch into the operatively connected state or releasing the lock-up clutch from the operatively connected state based on a result derived from the determination made by the lock-up determining means, comprising;

gear position detecting means for detecting a gear position, and lock-up release controlling means for changing a pattern representing the reduction of an operative connecting force of the lock-up clutch based on a gear position at the time when it is determined that the lock-up clutch should be released from the operatively connected state.

With the lock-up controlling apparatus constructed in the above-described manner, when the gear position detected by the gear position detecting means represents second speed, the operative connecting force of the lock-up clutch may preferably be quickly reduced.

Alternatively, the reduction of the operative connecting force of the lock-up clutch may be attained in the following manner. Specifically, when the gear position detected by the gear position detecting means represents second speed, the operative connecting force of the clutch is reduced at a first high speed, when the gear position detected by the gear position detecting means represents third speed, the operative connecting force of the lock-up clutch is reduced at a second appreciably lower speed, and when the gear position detected by the gear position detecting means represent neither second speed nor third speed, the operative connecting force of the lock-up clutch is reduced at a third speed lower than the second speed.

As is apparent from the above description, a characterizing feature of the lock-up clutch controlling apparatus of the present invention consists in that the aforementioned problems inherent to the conventional lock-up controlling apparatuses can be eliminated by changing a pattern representing a speed of reduction of the operative connecting force based on the engine load, the vehicle speed or the gear position. Specifically, according to the present invention, the lock-up controlling means practically constructed in the form of a lock-up controller determines the working lock-up range on the basis of the engine load detected by the engine load sensor and the vehicle speed detected by the vehicle speed sensor, and subsequently, when it is found that the lock-up clutch is not released from the operatively connected state, the lock-up controlling means determines whether the lock-up clutch should be released from the operatively connected state or not. In the case that it is determined that the lock-up clutch is to be released from the operatively connected state, the lock-up controlling means changes the lock-up clutch releasing pattern based on the present magnitude of engine load. With this construction, since the lock-up clutch is quickly released from the operatively connected state, at the time of coasting of a vehicle, there do not arise malfunctions that the engine brake excessively strongly functions so that a driver unpleasantly feels a stifling shock. In addition, since the lock-up clutch is comparatively quickly released from the operatively connected state also at the time of a large throttle valve opening degree, there does not arise another malfunction that acceleration behavior of an engine or a vehicle are degraded.

Other objects, features and advantages of the present invention will become apparent from reading of the following description which has been made in conjunction with the accompanying drawings.

BRIEF DESCRIPTION OF THE DRAWINGS

The present invention is illustrated in the following drawings in which.

DESCRIPTION OF THE PREFERRED EMBODIMENTS

Figure 1:
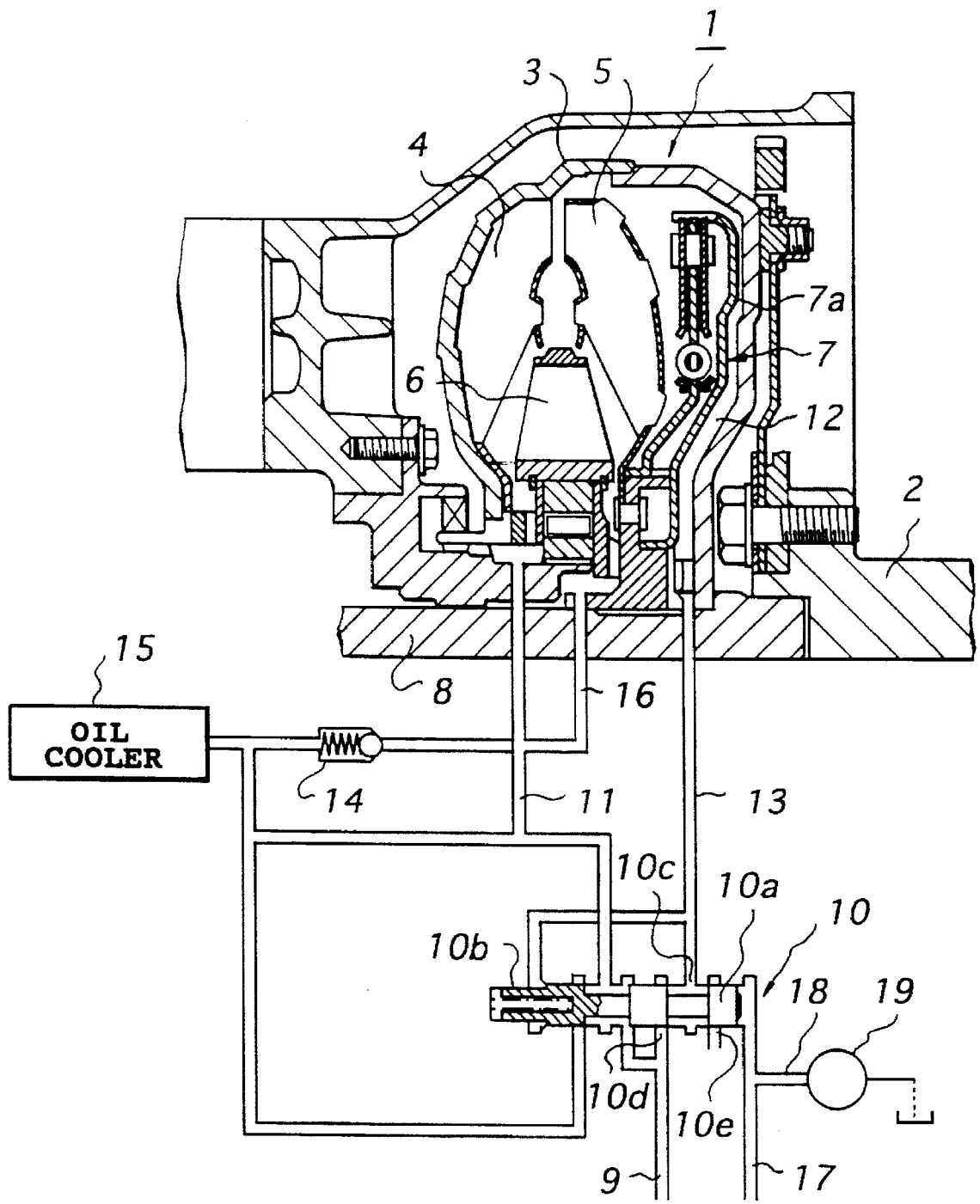
FIG. 1 is a sectional view of a lock-up device of a torque converter and a hydraulic circuit thereof to which the present invention is applied.

The present invention will now be described in detail with reference to the accompanying drawings which illustrate a preferred embodiments thereof.

First, the structure of a lock-up controlling apparatus employable for a torque converter to which the present invention is applied and the arrangement of a hydraulic circuit usable for a controlling operation to be performed by the lock-up controlling apparatus will be described below with reference to FIG. 1.

The torque converter generally designated by reference numeral 1 includes a pump 4, which is fixedly secured to the left-hand side of a case 3 connected to an output shaft 2 of an engine (not shown) so as to rotate together with the engine output shaft 2, a turbine 5 rotatably supported on the right-hand side of the case 3 to be rotationally driven via working fluid as the pump 4 is rotated, a stator 6 interposed between the pump 4 and the turbine 5 to increase a magnitude of torque when a speed ratio of the number of revolutions of the turbine 5 to the number of revolutions of the pump 4 is reduced below a predetermined value, and a lock-up clutch 7 interposed between the turbine 5 and the case 3.

The rotation of the turbine 5 is outputted via a turbine shaft 8 so that it is inputted into a speed changing gear mechanism (not shown). The base end part of the lock-up clutch 7 is connected to the turbine shaft 8, and when a lock-up piston 7a is operatively connected to the case 3, the engine output shaft 2 is directly connected to the turbine shaft 8.

Working fluid is introduced into the torque converter 1 via a main line 9 extending from an oil pump (not shown), a lock-up control valve 10 and a converter line 11 so as to allow the piston 7a of the lock-up clutch 7 to be normally biased in an operative connecting direction by pressure of the working fluid. A lock-up releasing line 13 extending from the lock-up control valve 10 is communicated with a hollow space 12 defined between the piston 7a of the lock-up clutch 7 and the case 3. Thus, when a hydraulic pressure (serving as a releasing pressure) is introduced into the hollow space 12 via the lock-up releasing line 13, the lock-up clutch 7 is released from the operatively connected state. In addition, a converter outflow line 16 is connected to the torque converter 1 via a check valve 14 so as to allow an oil cooler 13 to be supplied with the working fluid.

On the other hand, the lock-up control valve 10 includes a spool 10a, a coil spring 10b for normally biasing the spool 10a in the rightward direction as seen in FIG. 1 and a port 10c communicated with the lock-up releasing line 13, and a pressure adjusting port 10d and a drain port 10e are formed on the opposite sides of the port 10c. In addition, a control line 17 is connected to the right-hand end of the lock-up control valve 10 for allowing a pilot pressure to be applied to the spool 10a, and a duty solenoid valve 19 is disposed on a drain line 18 which is branched from the control line 17.

The duty solenoid valve 19 serves to adjust the pilot pressure in the control line 17 to assume a value corresponding to a duty ratio determined in conformity with an input signal inputted thereinto by repeating ON and OFF of the duty solenoid valve 19 at the foregoing duty ratio to repeatedly open and close the drain line 18 by a very short period (e.g., 0.02 second). The pilot pressure is applied to the spool 10a in the direction against the resilient force of the coil spring 1b. The releasing pressure in the lock-up releasing line 13 is also applied to the spool 10a in the same direction as that of the resilient force of the spring 10b. When the spool 10a is displaced depending on the relationship between the releasing pressure in the lock-up releasing line 13 and the resilient force of the coil spring 10b, the lock-up releasing line 13 is communicated with the main line 9 (corresponding to the pressure adjusting port 10d) or the drain port 10e, whereby the lock-up releasing pressure is adjusted to assume a value corresponding to the pilot pressure, i.e., the duty ratio of the duty solenoid valve 19.

When the duty ratio is increased to assume the maximum value, a quantity of fluid to be drained from the control line 17 is maximized, causing the lock-up clutch 7 to be brought in the completely operatively connected state. On the contrary, in the case that when the duty ratio is reduced to assume the minimum value, a quantity of fluid to be drained from the control line 17 is minimized, the pilot pressure of the releasing pressure is maximized, causing the lock-up clutch 7 to be brought in the completely released state. When the duty ratio assumes an intermediate value lying between the maximum value and the minimum value, the lock-up clutch 7 is brought in the slippery state. While the foregoing state is maintained, the releasing pressure is adjusted corresponding to the duty ratio, resulting in the slip rate of the lock-up clutch 7 being properly controlled.

Figure 2:
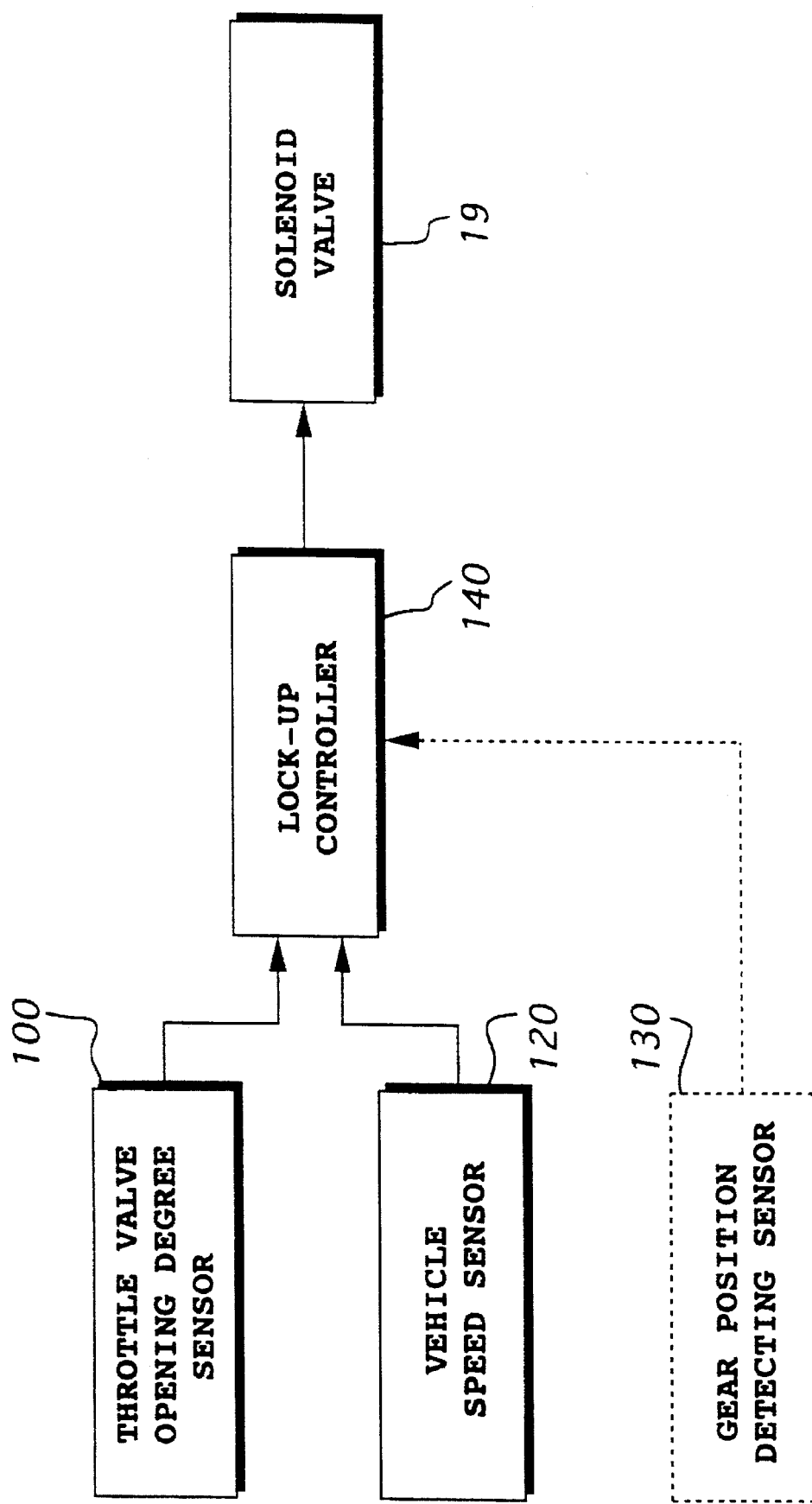
FIG. 2 is a block diagram which shows an embodiment of the present invention of a controlling system.

FIG. 2 is a block diagram which schematically shows a controlling system of the present invention. The controlling system includes a throttle valve opening degree sensor 100 serving as an engine load sensor. A signal indicating the throttle valve opening degree detected by the sensor 100 and a signal detected by a vehicle speed sensor 120 are inputted into a lock-up controller 140. In response to the throttle valve opening degree signal outputted from the throttle opening degree sensor 100 and the vehicle speed signal outputted from the vehicle speed sensor 120, the lock-up controller 140 including a microcomputer as a main structural element (hereinafter referred to simply as a controller 140) determines whether a lock-up clutch should be brought into the operatively connected state or not, and on completion of the foregoing determination, it outputs a signal to the solenoid valve 19 (serving as lock-up actuating means) shown in FIG. 1. It should be noted that the controller 140 is programmed in such a manner as to constitute lock-up determining means and lock-up release controlling means.

Figure 3:
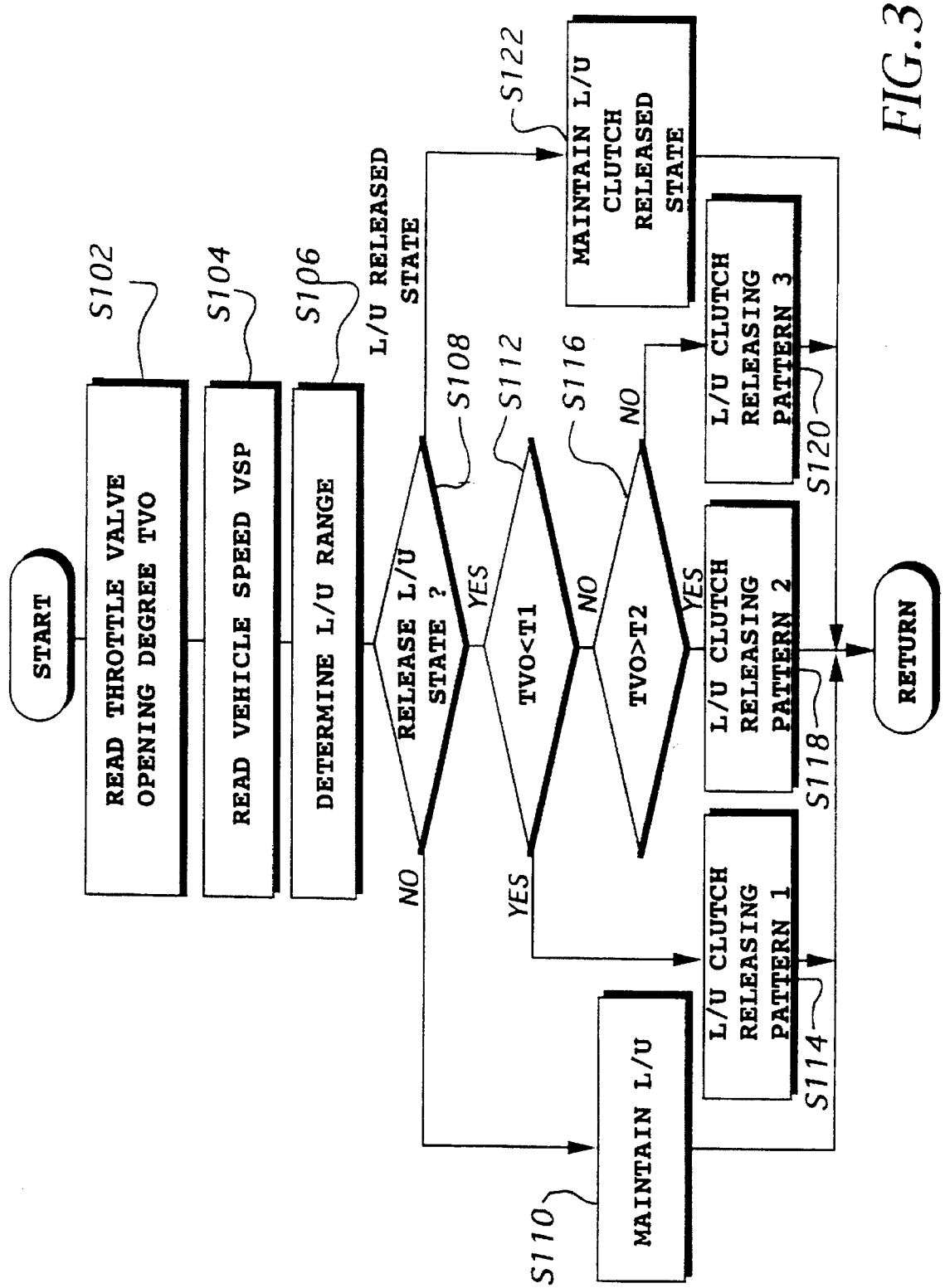
FIG. 3 is a flowchart which shows a series of steps to be executed by a lock-up controlling apparatus for an automatic transmission constructed according to a first embodiment of the present invention.
Figure 4:
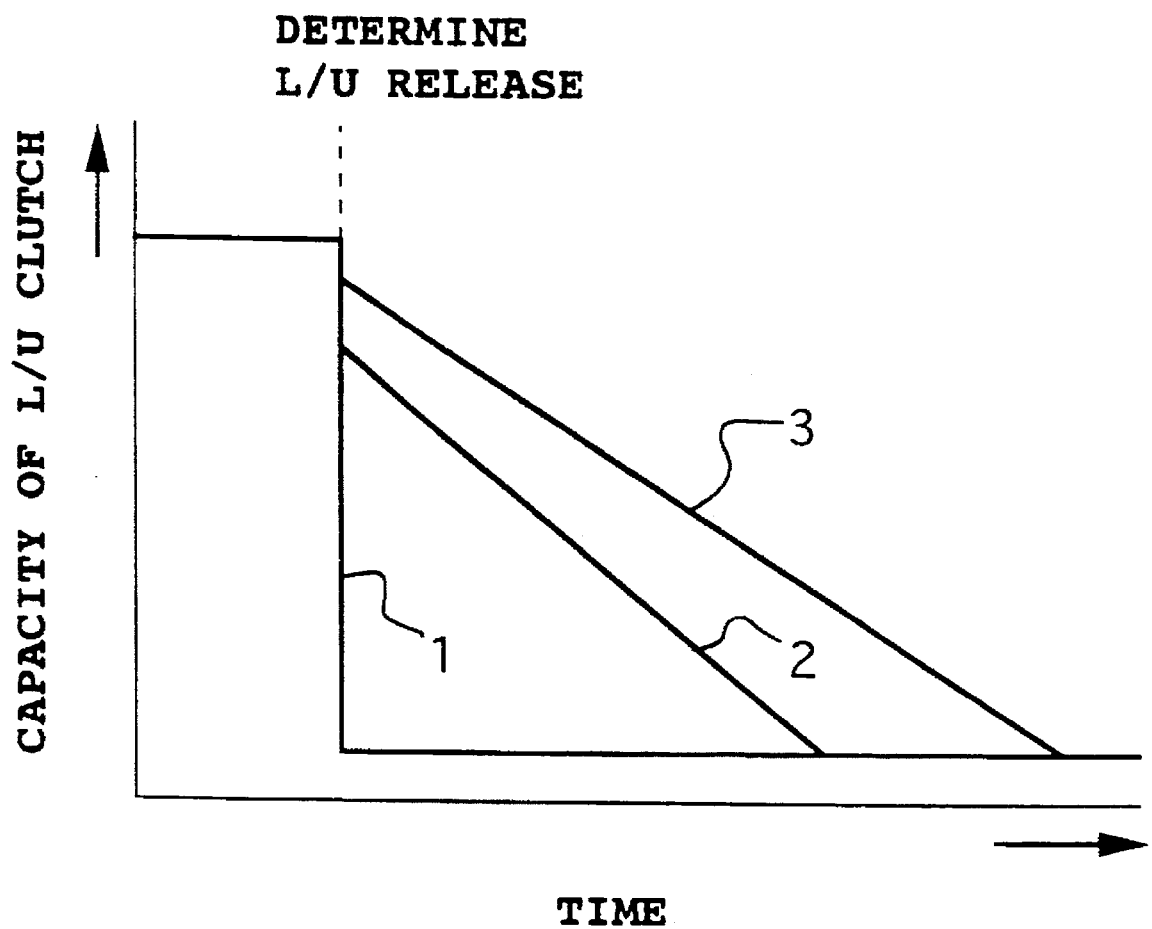
FIG. 4 is a graph which schematically shows a lock-up clutch releasing pattern employable for the lock-up controlling apparatus constructed according to the first embodiment of the present invention.

FIG. 3 is a flowchart which shows a series of steps to be executed by a lock-up controlling apparatus for an automatic transmission constructed according to a first embodiment of the present invention. First, the controller 140 reads in a throttle valve opening degree TVO detected by the throttle opening degree sensor 100 (Step S102). Next, the controller 140 reads in a vehicle speed VSP detected by the vehicle speed sensor 120 (Step S104). Subsequently, the controller 140 determines a lock-up range based on the detected throttle valve opening degree TVO and the detected vehicle speed VSP (Step S106). Subsequently, the controller 140 determines whether the lock-up state should be released or not (Step S108). In the case that the lock-up state should not be released, the present lock-up state is maintained while it is left unchanged (Step S110). On the contrary, in the case that the lock-up state should be released, the controller 140 determines whether the detected throttle valve opening degree TVO is smaller than a first preset throttle valve opening degree T1 or not (Step S112). When it is found that the detected throttle valve opening degree TVO is smaller than the first preset throttle valve opening degree T1, the controller 140 selects a lock-up clutch releasing pattern 1 which extends in the upward direction at a right angle relative to the abscissa shown in FIG. 4 (Step S114). In Step S114, the lock-up clutch is immediately released from the operatively connected state. On the contrary, when it is found that the detected throttle valve opening degree TVO is equal to or larger than the first preset throttle valve opening degree T1, the controller 140 determines whether the detected throttle valve opening degree TVO is larger than a second preset throttle valve opening degree T2 or not (Step S116). It should be noted that the second preset throttle valve opening degree T2 assumes a value larger than the first preset throttle valve opening degree T1. In the case that the throttle valve opening degree TVO detected by the throttle valve opening degree sensor 100 is larger than the second preset throttle valve opening degree T2, the controller 140 selects a lock-up releasing pattern 2 which slantwise downwardly extends in the rightward direction at about 45 degrees relative to the ordinate as shown in FIG. 4 (Step S118). When it is found that the detected throttle valve opening degree TVO is equal to or smaller than the second preset throttle valve opening degree T2 (more concretely, equal to or larger than the first preset throttle valve opening degree T1 but equal to or smaller than the second throttle valve opening degree T2), the controller 140 selects a lock-up releasing pattern 3 which slantwise downwardly extends in the rightward direction at about 30 degrees relative to the ordinate as shown in FIG. 4 (Step S120). It should be noted that in Step S108 it is found the lock-up clutch has not been operatively connected, the present lock-up released state is maintained while it left unchanged (Step S122).

With such sequence, the duty ratio of the duty solenoid valve 19 is controlled in conformity with the command issued from the controller 140 as time elapses in such a manner that the lock-up clutch 7 can most quickly reduce the operative connecting force at the time of coasting of a vehicle having a small throttle valve opening degree, it can slowly reduce the same at the time of an intermediate throttle valve opening degree, and it can appreciably slowly reduce the same at the time of a large throttle valve opening degree. Consequently, the lock-up controlling apparatus assures that there do not arise malfunctions that a driver unpleasantly feels a stifling shock at the time of coasting of his vehicle, and moreover, acceleration behavior of the engine are degraded at the time of a large throttle valve opening degree. In addition, in the case of an intermediate throttle valve opening degree, there does not arise another malfunction that the driver feels an unpleasant shock due to quick releasing of the lock-up state, because the lock-up state can reliably be released with the lock-up controlling apparatus.

Figure 5:
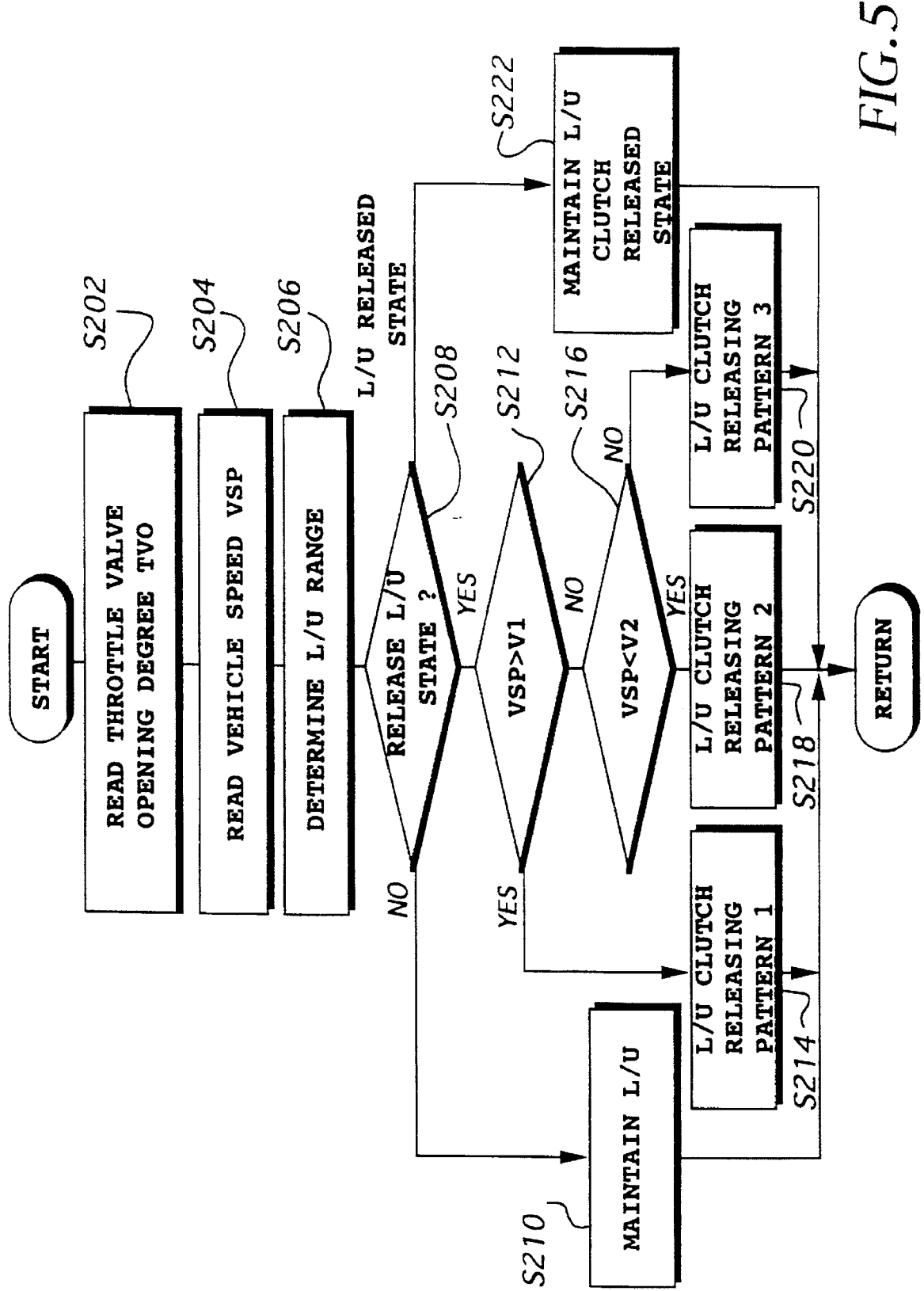
FIG. 5 is a flowchart which shows a series of steps to be executed by a lock-up controlling apparatus for an automatic transmission constructed according to a second embodiment of the present invention.
Figure 6:
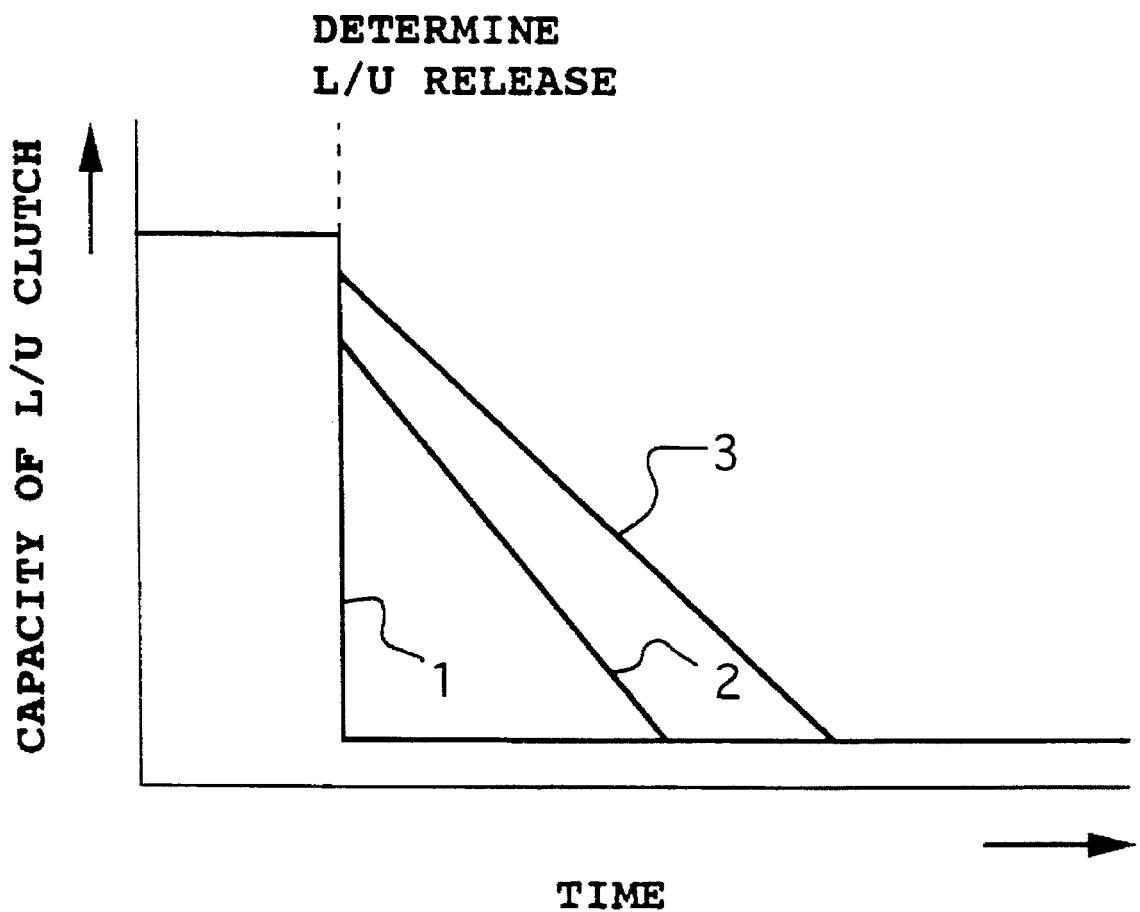
FIG. 6 is a graph which schematically shows a lock-up clutch releasing pattern employable for the lock-up controlling apparatus constructed according to the second embodiment of the present invention.

FIG. 5 is a flowchart which shows a series of steps to be executed by a lock-up controlling apparatus according to a second embodiment of the present invention. In contrast with the first embodiment of the present invention wherein a lock-up clutch releasing pattern is selected depending on the detected throttle valve opening degree TVO, in this embodiment, a lock-up clutch releasing pattern is selected depending on the detected vehicle speed VSP, and other functional conditions rather than the foregoing one are the same as those in the preceding embodiment. Specifically, when it is found as a result derived from the determination made in Step S212 that the detected vehicle speed VSP is higher than a first preset vehicle speed B1, the controller 140 selects a lock-up clutch releasing pattern 1 which extends in the upward direction at a right angle relative to the abscissa as shown in FIG. 6 (Step S214). When it is found in Step 216 that the detected vehicle speed VSP is lower than a second preset vehicle speed V2, the controller 140 selects a lock-up clutch releasing pattern 2 which slantwise downwardly extend in the rightward direction at about 60 degrees relative to the ordinate as shown in FIG. 6. In addition, when the detected vehicle speed VSP is equal to or higher than the second preset vehicle speed V2, the controller 140 selects a lock-up clutch releasing pattern 3 which slantwise downwardly extends in the rightward direction at about 45 degrees relative to the ordinate as shown in FIG. 6 (Step S220). It should be noted that the first preset vehicle speed B the 1 assumes a value higher than that of the second preset vehicle speed B the 2.

With this control, the lock-up controlling apparatus assures that the lock-up clutch 7 can quickly reduce the operative connecting force at the time of a high vehicle speed, it can slowly reduce the same at the time of an intermediate vehicle speed, and it can appreciably slowly reduce the same at the time of a low vehicle speed. Thus, a quantity of slippage of the lock-up clutch 7 can be reduced and wear resistance of each clutch facing can be improved by quickly releasing the lock-up state at the time of a high vehicle speed. In addition, a malfunction of engine stall liable to occur when a release speed is excessively slow can be prevented by appreciably slowly releasing the lock-up state at a low vehicle speed.

Figure 7:
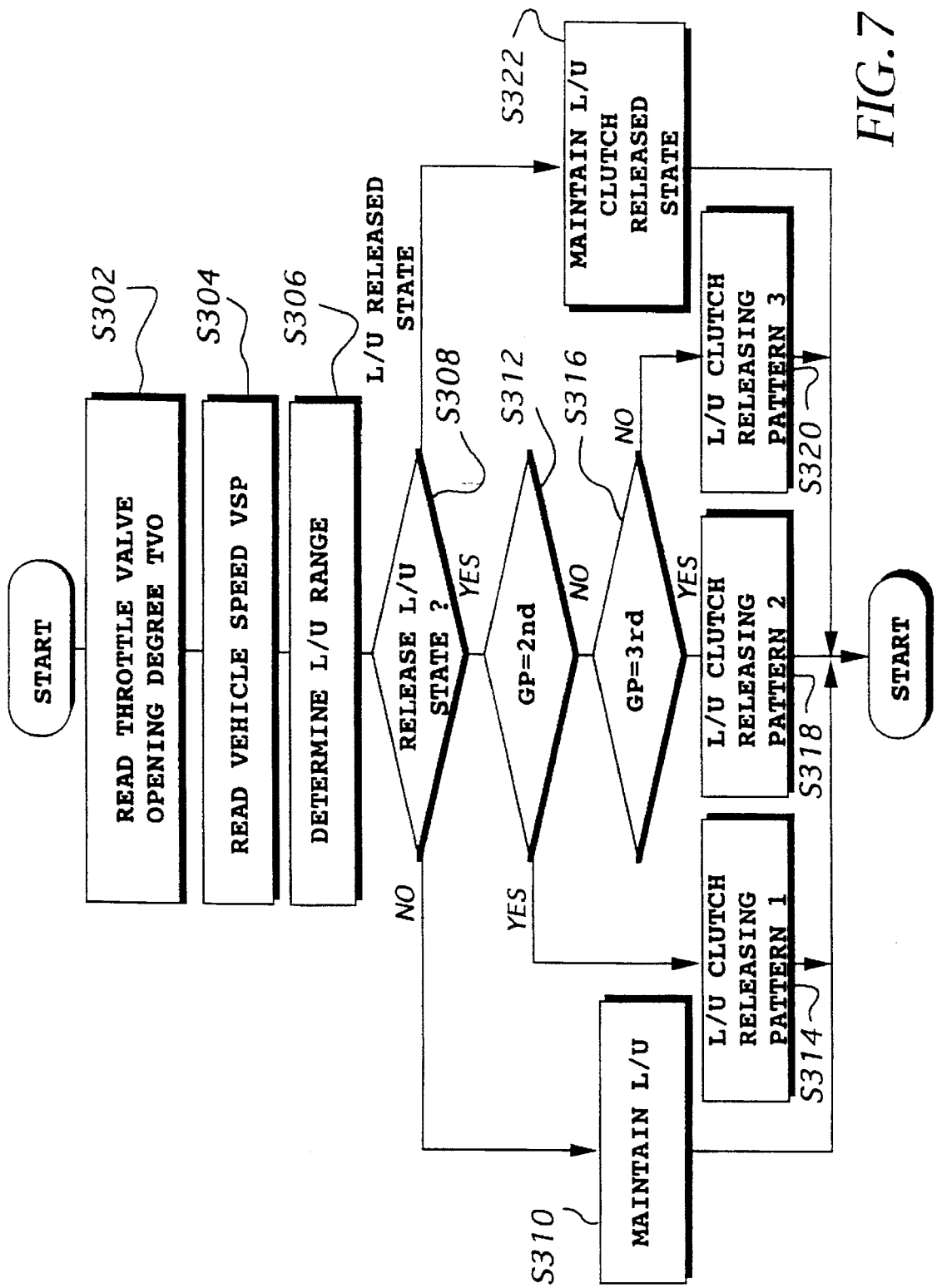
FIG. 7 is a flowchart which shows a series of steps to be executed by a lock-up controlling apparatus for an automatic transmission constructed according to a third embodiment of the present invention.
Figure 8:
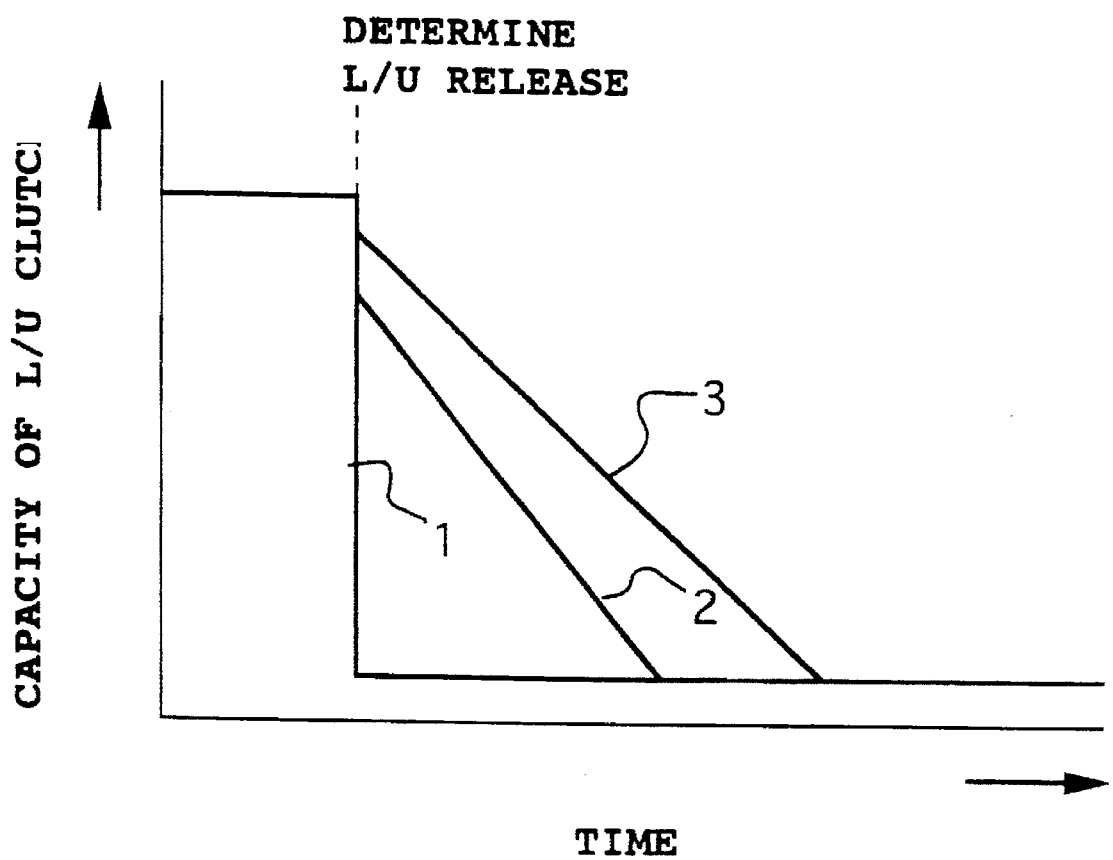
FIG. 8 is a graph which schematically shows a lock-up clutch releasing pattern employable for the lock-up controlling apparatus constructed according to the third embodiment of the present invention.

FIG. 7 is a flowchart which shows a series of steps to be executed by a lock-up controlling apparatus according to a third embodiment of the present invention. In contrast with the first embodiment of the present invention wherein a lock-up clutch releasing pattern is selected depending on the throttle opening degree TVO, in this embodiment, a lock-up clutch releasing pattern is selected depending on gear positions GP, and other functional conditions rather than the foregoing one are the same as those in the first embodiment of the present invention. Specifically, in the case that the gear position GP is in second speed, the controller 140 selects a lock-up clutch releasing pattern 1 which extends in the upward direction at a right angle relative to the abscissa as shown in FIG. 8. In the case that the gear position GP is in third speed, the controller 140 selects a lock-up clutch releasing pattern 2 which slantwise downward extends in the rightward direction at about 30 degrees relative to the ordinate as shown in FIG. 8. Alternatively, in the case that the gear position GP is neither in second speed nor third speed, the controller 140 selects a lock-up clutch releasing pattern 3 which slantwise downwardly extends in the rightward direction at about 45 degrees relative to the ordinate as shown in FIG. 8.

With this control, the lock-up controlling apparatus assures that the lock-up clutch 7 can quickly reduce the operative connecting force when the gear position GP is in second speed, it can appreciably slowly reduce the operative connecting force when the gear position GP is in third position, and it can slowly reduce the operative connecting force when the gear position GP is not in both second speed and third speed, e.g., fourth speed or higher. At any rate, acceleration behavior of the engine can be improved by effectively utilizing slippage of the torque converter in such a manner as to quickly release the lock-up state as the gear position GP is positioned in lower speed more and more. It is obvious that acceleration behavior of the vehicle can correspondingly be improved as the acceleration behavior of the engine are improved in that way.

While the present invention has been described above with respect to a few preferred embodiments thereof, it should of course be understood that the present invention should not be limited only to these embodiments but various change or modification may be made without any departure from the scope of the present invention as defined by the appended claims.

What is claimed is:

1. A lock-up controlling apparatus for an automatic transmission including an engine load sensor for detecting an engine load, a vehicle speed sensor for detecting a vehicle speed, a lock-up determining device for determining, based on a detection value derived from said engine load sensor and a detection value derived from said vehicle speed sensor, whether a lock-up clutch should be brought into an operatively connected state or said lock-up clutch should be released from the operatively connected state; and a lock-up actuator for bringing said lock-up clutch into the operatively connected state or releasing said lock-up clutch from the operatively connected state based on a result derived from the determination made by said lock-up determining device, comprising:

a gear position controlling system for selecting from a predetermined range of patterns representing the reduction of an operative connecting force of said lock-up clutch based primarily on a gear position at the time when it is determined that said lock-up clutch should be released from the operatively connected state.

2. A lock-up controlling apparatus for an automatic transmission including an engine load sensor for detecting an engine load, a vehicle speed sensor for detecting a vehicle speed, a lock-up determining device for determining, based on a detection value derived from said engine load sensor and a detection value derived from said vehicle speed sensor, whether a lock-up clutch should be brought into an operatively connected state or said lock-up clutch should be released from the operatively connected state; and a lock-up actuator for bringing said lock-up clutch into the operatively connected state or releasing said lock-up clutch from the operatively connected state based on a result derived from the determination made by said lock-up determining device, comprising:

a gear position controlling system for changing a pattern representing the reduction of an operative connecting force of said lock-up clutch based on a gear position at the time when it is determined that said lock-up clutch should be released from the operatively connected state, wherein when the gear position detected represents a first speed, the operative connecting force of said lock-up clutch is quickly reduced.

3. A lock-up controlling apparatus for an automatic transmission including an engine load sensor for detecting an engine load, a vehicle speed sensor for detecting a vehicle speed, a lock-up determining device for determining, based on a detection value derived from said engine load sensor and a detection value derived from said vehicle speed sensor, whether a lock-up clutch should be brought into an operatively connected state or said lock-up clutch should be released from the operatively connected state; and a lock-up actuator for bringing said lock-up clutch into the operatively connected state or releasing said lock-up clutch from the operatively connected state based on a result derived from the determination made by said lock-up determining device, comprising:

a gear position controlling system for changing a pattern representing the reduction of an operative connecting force of said lock-up clutch based on a gear position at the time when it is determined that said lock-up clutch should be released from the operatively connected state, wherein when the gear position detected represents a first speed, the operative connecting force of said lock-up clutch is reduced at a first rate; and when the gear position detected represents a second speed, the operative connecting force of said lock-up clutch is reduced at a second rate; and when the gear position represents neither the first speed nor the second speed, the operative connecting force of said lock-up clutch is reduced at a third rate, lower than said second rate.

4. A lock-up controlling apparatus for an automatic transmission including;

an engine load sensor for detecting an engine load;

a vehicle speed sensor for detecting a vehicle speed;

a lock-up determining device for determining, based on a detection value derived from said engine load sensor, and a detection value derived from said vehicle speed sensor, whether a lock-up clutch should be brought into an operatively connected state or said lock-up clutch should be released from the operatively connected state; and a lock-up actuator for bringing said lock-up clutch into the operatively connected state or releasing said lock-up clutch from the operatively connected state based on a result derived from the determination made by said lock-up determining device, said lock-up controlling apparatus comprising;

a lock-up release controlling system for changing a pattern representing the reduction of an operative connecting force of said lock-up clutch based on a vehicle speed detection value at the time when it is determined that said lock-up clutch should be released from the operatively connected state; and wherein when a magnitude of said vehicle speed detection value is larger than a first predetermined value, the operative connecting force of said lock-up clutch is reduced at a first speed (V1); and when a magnitude of said vehicle speed detection value lies between said first predetermined value and a second predetermined value smaller than the first predetermined value, the operative connecting force of said lock-up clutch is reduced at a second speed (V2) which is less than the first speed (V1); and when a magnitude of said vehicle speed detection value is smaller than said second predetermined value, the operative connecting force of said lock-up clutch is reduced at a third speed (V3) lying between said first speed (V1) and said second speed (V2).

5. A lock-up controlling apparatus for a lock-up clutch of a torque converter for an automatic transmission, said apparatus comprising:

an engine load sensor for detecting engine load values;

a vehicle speed sensor for detecting vehicle speed values;

a determining device for determining operation conditions of the lock-up clutch, said operation conditions to be adjusted based on the engine load values and on the vehicle speed values;

a lock-up actuator for respectively engaging and disengaging the lock-up clutch based on the operation conditions, said lock-up actuator comprising a controller for gradually decreasing the connecting force of said lock-up clutch corresponding to a release pattern the characteristics of which are based on a vehicle speed value when it is determined that the lock-up clutch should be released; and wherein relative to the value of the connecting force during a completely engaged lock-up clutch, the connecting force of said lock-up clutch is reduced at a first rate (R1) when the magnitude of said vehicle speed value is larger than a first predetermined value (V1); and wherein relative to the value of the connecting force during a completely engaged lock-up clutch, the connecting force of said lock-up clutch is reduced at a second rate (R2), smaller than said first rate (R1), when the magnitude of said vehicle speed value lies between said first predetermined value (V1) and a second predetermined value (V2), wherein said second value is smaller than said first value (V2<V1); and wherein relative to the value of the connecting force during a completely engaged lock-up clutch, the connecting force of said lock-up clutch is reduced at a third rate (R3), lying between said first rate (R1) and said second rate (R2), when the magnitude of said vehicle speed value is smaller than the second predetermined value (V2).

* * * * *